Dec. 5, 1950   J. S. RHYNE   2,532,333
GYROSTABILIZER

Filed Feb. 18, 1943   2 Sheets-Sheet 1

INVENTORS
Jeff S. Rhyne
BY
C. C. Hernstrom & H. E. Thibodeau
ATTORNEYS

Dec. 5, 1950          J. S. RHYNE          2,532,333
GYROSTABILIZER
Filed Feb. 18, 1943          2 Sheets-Sheet 2
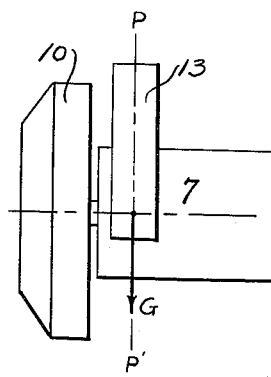
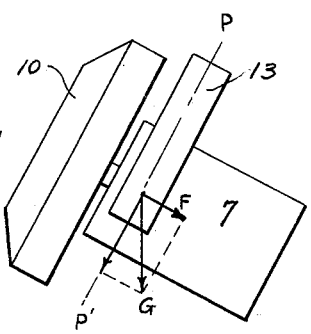
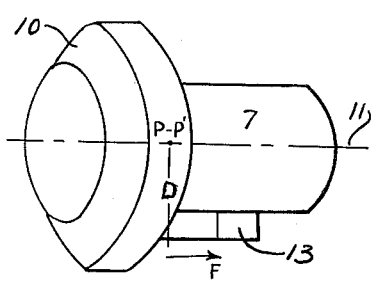
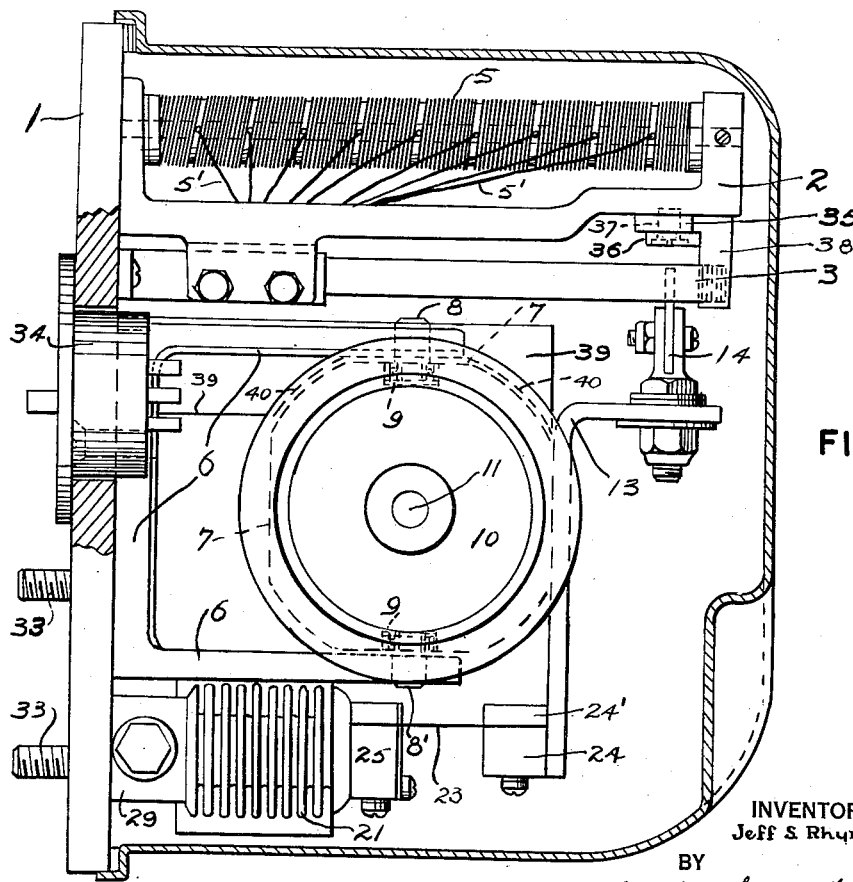
INVENTORS
Jeff S. Rhyne
BY
*C.E. Herrstrom & H.E. Thibodeau*
ATTORNEYS

UNITED STATES PATENT OFFICE 2,532,333

GYROSTABILIZER

Jeff Smith Rhyne, Detroit, Mich., assignor to the United States of America as represented by the Secretary of War Application February 18, 1943, Serial No. 476,296

9 Claims. (Cl. 74—5.22)

(Granted under the act of March 3, 1883, as amended April 30, 1928; 370 O. G. 757)

The invention described herein may be manufactured and used by or for the Government for governmental purposes without the payment to me of any royalty thereon.

The present invention pertains to a novel gyrostabilizer designed particularly for the gun of an armored combat vehicle. Nevertheless, the invention has a broad application in the general field of gyro-stabilizing.

The principal object of the invention is to simplify existing apparatus and to overcome the major effect of the drift of a single gyroscope having no vertical reference. This can best be discussed in connection with the stabilizer now in use on combat tanks such as that disclosed in the patent to John G. Ritter, 2,395,940, dated March 5, 1946. This system comprises an upper gyroscope with a vertical spinning axis and a lower gyroscope on a horizontal spinning axis. The upper instrument has hitherto been considered necessary for vertical reference. It carries a suspended framework or cradle on which are mounted opposed sets of normally spaced contactor blades governing a resistor. The lower gyroscope carries an actuating finger mounted between the sets of blades and so positioned that it moves toward one set or the other on precession of the lower gyroscope. The upper gyroscope holds the vertical reference so that any turning of the support moves the blades transversely of the actuating finger. The precession of each gyroscope contributes to relative movement between the resistor actuator and the resistor blades.

The resistor and its cradle constitute a substantial mass suspended from the upper gyroscope. This mass is objectionable for the reason that any acceleration or deceleration of the vehicle causes the vertical gyroscope to precess to its limit and lose control, requiring a substantial period of time (one-half to one minute) to restore itself. During this interval, the motion of the gun is so rapid that the gunner cannot follow it with the handwheel.

The improvement brought about by this invention consists in removing the upper gyroscope, fixing the resistor blades and the resistor on the common pivotal support that carries the remaining gyroscope, and compensating in another way for the absence of the upper gyroscope. Without the upper gyroscope, the lower or remaining gyroscope is subject to drift, carrying the common support and the resistor in a corresponding movement, so that there is no relative movement between the resistor and its actuator carried by the lower gyroscope.

According to the invention, a mass is mounted on the lower or horizontal gyroscope in such a manner that it is ineffective during normal precession. However, when the gyroscope drifts, a component of the force of gravity acting on the mass turns the gyroscope in the direction of precession. The resistor blades are thereby engaged by the actuator, whereupon the mechanical restoring apparatus is set in operation. The resistor represents any energy controlling device such as a hydraulic valve, an air valve, an electronic tube or the like.

The invention is fully disclosed by way of example in the following description and in the accompanying drawings in which:

Figure 3 is a vertical section at right angles to Figure 1,

Figure 4 is a diagram illustrating the lateral mass in the normal position of the gyroscope;

Figure 5 is a diagram illustrating the effect of the mass in a drift position of the gyroscope, Figure 6 is the same diagram in plan view.

Reference to these views will now be made by use of like characters which are employed to designate corresponding parts throughout.

Figures 1, 2, 7:
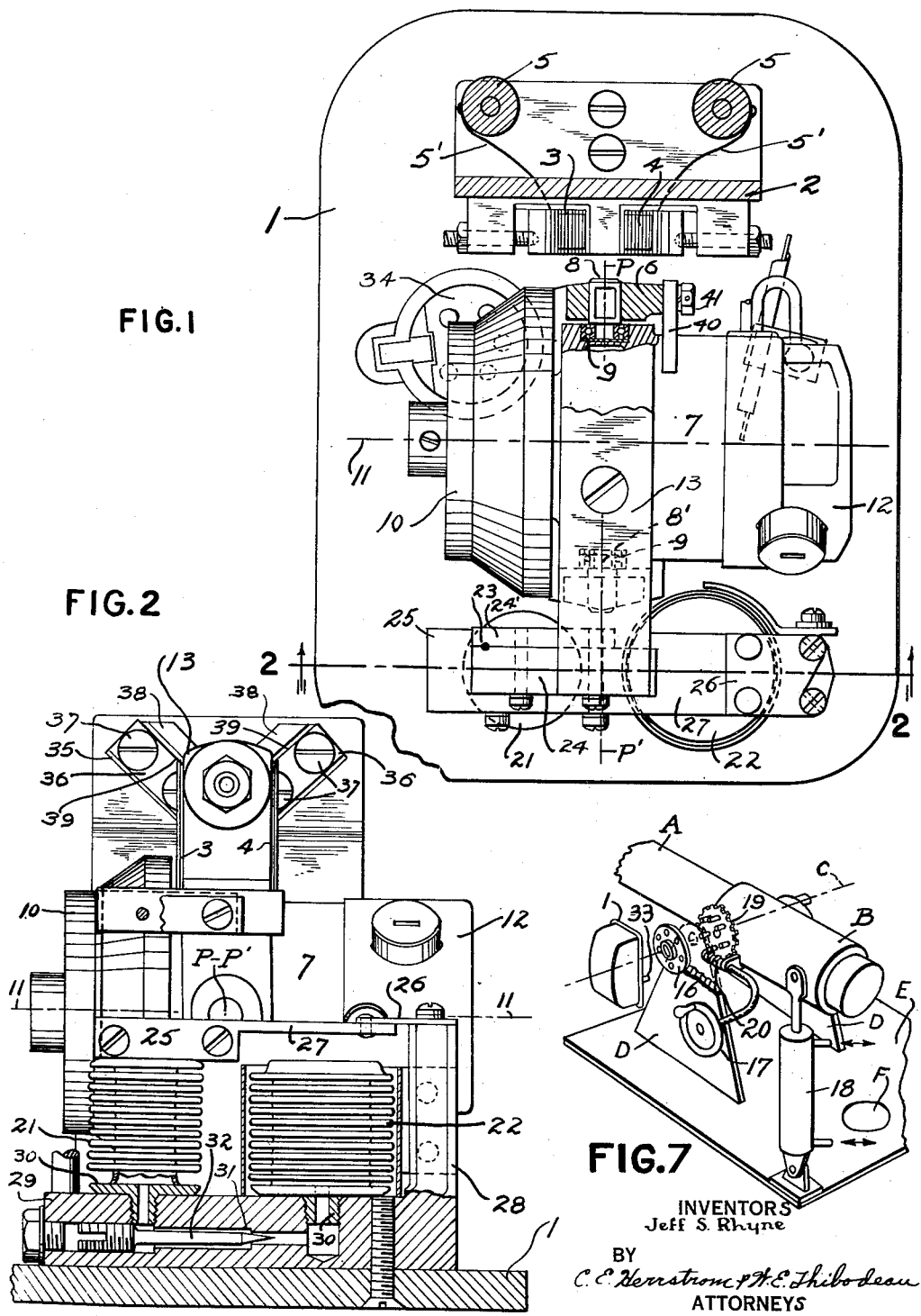
Figure 1 is a vertical elevation inside the box and partly in section.
Figure 2 is a section on the line 2—2 of Figure 1.
Figure 7 is a schematic exploded perspective view of a power-controlled gun showing the manner in which the stabilizer forming the subject of our invention, is mounted upon the cradle thereof.

For convenience the invention will be described in connection with a gun A (Fig. 7) mounted for elevation about a normally horizontal trunnion axis C by supports D fixed to a base E forming part of a traveling vehicle or platform such as a combat tank, which base may be pivoted to effect movement of the gun in train about a normally vertical axis relatively to the vehicle, as indicated at F. This construction is well known and, per se, forms no part of applicant's invention. The common support is a mounting support or control box I pivotally mounted on the gun cradle B and mechanically connected with a manual gun control such as a hand wheel 17. Actuation of this control exerts a force tending to move the support I and this force precesses the gyroscope even before movement of the support occurs, in accordance with well known principles, so that the support maintains a vertical position in this operation. The precession is utilized to regulate a resistor controlling an electromagnet, the armature of which is a needle valve governing a fluid pressure system for altering the elevation of the gun. This general arrangement is disclosed in the previously-identified patent to Ritter and need not be shown in detail here.

In one embodiment of the invention, a frame 2 for a pair of resistors 5 or other energy control device is rigidly attached to the pivotal support 1. The frame 2 carries two spaced sets 3 and 4 of individually spaced contactor blades, wired individually at 5' to the resistors in the electromagnet circuit, as described above.

A suitable support 6 also fixed to the member 1 provides the mounting for the gyroscope. A motor housing 7 functions as the first gimbal ring of the gyroscope and is provided with vertical pivots 8 and 8' mounted in ball bearings 9 and constituting the precession axis P—P'. Adjacent to the housing 7 is mounted the flywheel 10 on a horizontal spinning axis indicated by the numeral 11. The flywheel is driven by a suitable electric motor 12 in a manner well known in the art.

A bracket 13 is attached to the side of the housing 7 and carries an actuating finger 14 extending into the space between the sets 3 and 4 of resistor blades. A force tending to move the support 1 in a direction that would tilt the axis 11 in the vertical plane through said axis precesses the gyroscope horizontally and thereby moves the finger or actuator 14 against one or the other set of blades. The previously mentioned electromagnet is thus energized in a corresponding degree to permit a corresponding counteracting force to be exerted on the controlled member, in this case the gun.

The mass of the bracket 13 should not interfere with normal precession. Accordingly, it is spaced laterally from the plane of the precession axis P—P' and the spinning axis 11 in which position it has no effect on precession while the support 1 remains vertical.

The gyroscope, lacking a vertical reference, is however subject to drift as shown, somewhat exaggerated, in Figures 5 and 6. The common support 1 drifts likewise because of the mounting of the pivots 8, 9 in a fixed position relatively to the support. Consequently there is no relative movement between the actuating finger 14 and the resistor blades 3, 4 and no restoration through the gun elevating mechanism.

In the drift position of the gyroscope, shown in Figure 5, the force of gravity G on the bracket 13 has a component F parallel to the spinning axis. Due to the distance D of the mass from the precession axis, as shown in Figure 6, this component of force turns the gyroscope on its pivotal axis, thereby moving the actuating finger 14 relatively to the resistor blades, whereupon a restoring action through the elevating mechanism is initiated.

The gyroscope is dampened by a pair of bellows 21 and 22 mounted beneath the rod 15 with their axes parallel thereto. A piece of piano wire 23 is clamped between blocks 24, 24' suitably fastened to the lower end of the bracket 13. The wire extends into a head 25 on the movable end of the bellows 21. This end of the bellows is resiliently held by a flat spring 26 riveted to an extension 27 of the block 25 and fastened to a post 28 secured to the support 1, as shown in Figure 2.

The post 28 is part of a block 29 having threaded apertures receiving nipples unitary with the fixed ends of the bellows, as indicated at 30', Figure 2. The block 29 is formed with a passage 31 connecting the nipples and delicately controlled by a needle valve 32. These refinements in the bellows damping system are embodied in the aforementioned prior device and therefore require no detailed description.

The outer surface of the plate 1 carries a suitable number of studs 33 for attachment to a plate 16 (Fig. 7) which in turn is pivotally mounted on the gun cradle or other device to be stabilized as pointed out above. Figure 7 shows one of the many possible constructions, where plate 16 may be attached to a gear 19 provided on one trunnion of cradle B. A worm 20 journaled on the cradle, meshes with gear 19 and is connected by a flexible shaft, with hand wheel 17, whereby rotation of the hand wheel may effect pivotal movement of support 1 and parts carried thereby relatively to the gun. A plug 34 also mounted in the support 1 carries the appropriate leads (not shown) for the motor and resistors.

The blades 3 and 4 are set and held in the proper spacing by inclined surfaces 39 engaging their free or forward ends. For this purpose a block 35 for each set of blades is adjustably mounted on and beneath the frame 2 and then secured in this position by means of a clamp plate 36 and screws 37. Each such block has a depending lip 38 with a vertical surface 39 inclined relatively to the blades and engaged by their ends. A minute spacing of consecutive blades is thus maintained. As the blades of either set are successively brought into contact with each other by movement of the actuator 14, some windings of the corresponding coil 5 are cut out of the circuit and more current is supplied to the corresponding electromagnet of the aforesaid fluid pressure system supplying actuating fluid to gun elevation cylinder 18, Figure 7.

A bracket 40 is attached by means of screw 41 to the support 6 and is formed with a curved edge 42 spaced slightly from the motor housing 7, as may be seen in Figure 3. By reason of the slight spacing between the housing 7 and the edge 42, bracket acts to limit the precession of the gyroscope.

Owing to the absence of a vertical reference, by elimination of the vertical-axis gyroscope, this device permits a few degrees play on either side of the vertical. This, however, is not seriously objectionable inasmuch as it is slow enough to be readily compensated for by the manual control.

Acceleration and deceleration of the vehicle brings into play the inertia of the mass of the bracket 13, but this is negligible in comparison with the inertia of the heavy, pendulous parts associated with the upper gyroscope provided in the prior construction for vertical reference.

Although a specific embodiment of the invention has been illustrated and described, it will be understood that various alterations in the details of construction may be made without departing from the scope of the invention as indicated by the appended claims.

What I claim is:

1. In apparatus for stabilizing a pivotally-mounted object angularly about its mounting axis and wherein power means is arranged to apply forces to the object about the mounting axis to oppose angular motion thereof about such axis, a gyro including a support, a frame or casing pivotally carried by the support about a precession axis, and a rotor journaled in the frame or casing; means for mounting the support for angular movement with the object as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accompanied by proportional torque of the gyro about the precession axis; a control device for the power means and including an actuated member and an actuating member movable from mid-position relative to the actuated member to control the direction and magnitude of force applied by the power means to the object; an element unitary with the support and upon which said actuated member is mounted; and means for connecting the gyro frame or casing to the actuating member with the latter eccentric to the precession axis so that torque about the latter is effective for operation of the actuated member to control the power means to apply force opposing motion of the object about its mounting axis in response to the velocity of such motion.

2. In apparatus for stabilizing a pivotally-mounted object angularly about its mounting axis and wherein power means is arranged to apply forces to the object about the mounting axis to oppose angular motion thereof about such axis, a gyro including a support, a frame or casing pivotally carried by the support about a precession axis, and a rotor journaled in the frame or casing; means for mounting the support for angular movement with the object as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accompanied by proportional torque of the gyro about the precession axis; means acting on the gyro about the precession axis to oppose motion thereof about the latter so that the extent of movement about the precession axis in response to said torque is proportional to the angular velocity of the support about its axis of angular movement; a control device including an actuated member and an actuating member movable from mid-position relative thereto to operate the power means to apply to the object force whose direction and magnitude depends upon the direction and extent of movement of the actuating member from mid-position relative to the actuated member; an element unitary with the support and upon which the actuated member is mounted; and an arm attached to the gyro frame or casing and connected to the actuating member with the latter eccentric to the precession axis so that such actuating member moves with the gyro frame or casing about the precession axis to operate the actuated member for control of the power means to apply force opposing motion of the object about its mounting axis in response to the velocity of such motion.

3. Apparatus as claimed in claim 2 with a damper acting on the gyro frame or casing about the precession axis and including an orifice through which liquid is constrained to flow incident to movement of the gyro casing and rotor about the precession axis.

4. The combination with a gun mounted on an unstable platform for angular movement about a first axis fixed with respect to the platform, and motor means connected to so move said gun about said axis with respect to the platform, of a two-degree-of-freedom gyroscope adapted to develop a precessional torque proportional to the algebraic sum of the component angular rates of the platform and of said gun relatively to the platform, in a plane normal to said first axis, and means including resistance-varying elements connected with said gun for angular movement as a unit therewith and operated by said gyroscope in response to said precessional torque for controlling said motor means to rotate said gun about said axis relatively to the platform at a rate equal and opposite to the algebraic sum of said component angular rates.

5. The combination with a gun elevatable on a combat vehicle about a normally horizontal axis, motor means connected to so elevate said gun, of a gyroscope directly connected with said gun for precession in response to angular movement of said gun in a plane perpendicular to said axis, said precession being substantially directly proportional to the angular rate of movement of said gun in said plane, variable resistance means directly connected to said gun and controlling said motor means, and means movable with said gyroscope in precession for controlling said variable resistance means and thereby said motor means, to change the angular position of said gun about said normally horizontal axis relatively to the vehicle at a speed proportional to the instantaneous angle of precession of said gyroscope.

6. A gyroscopic stabilizer for a gun mounted upon an unstable platform, for angular movement about a first axis fixed perpendicular to said platform and a second axis perpendicular to said first axis and the bore of said gun, said gun having motor means connected to angularly move said gun relatively to said platform about said second axis, a two-degree-of-freedom, constrained gyroscope, means mounting said gyroscope on said gun with its mutually-perpendicular spin and precession axes normally lying in a plane perpendicular to said second axis and for adjustment relatively to said gun to vary the angular relation between said spin and precession axes and the bore of said gun, means fixedly attached to said mounting means and responsive to precession of said gyroscope for controlling said motor means to vary the rate of angular movement of said gun in proportion to the angle of precession of said gyroscope and in a direction corresponding to said precession, and manually-controlled means for adjusting said mounting means to effect adjustment of said spin and precession axes in said plane relatively to the gun whereby the elevation of the gun may be altered by precession of the gyroscope induced by said adjustment.

7. The combination with an object mounted upon an unstable platform for angular movement about a first axis fixed to said platform, and power means connected to so move said object, of a base, means mounting said base on said object for pivotal adjustment about a second axis parallel with said first axis, a gyroscope mounted on said base to develop a precessional torque proportional to the rate of angular movement of said object and platform in a plane normal to said axes, and means effecting operation of said power means in response to, and at a rate proportional to, said torque, said means including cooperating contact parts fixed to said base and gyroscope, respectively, whereby said object is moved relatively to said platform through an angle substantially proportional to the time integral of said rate to thereby stabilize said object about said axis relatively to space external of said platform.

8. In a system for stabilizing a gun mounted on a combat vehicle for movement about a first axis in fixed relation to said vehicle, and power means connected to so move said gun, a single rate responsive gyroscope, base means carried by said gun and mounting said gyroscope with its mutually perpendicular spin and precession axes normally lying in a plane perpendicular to said first axis for synchronous angular movement with said gun about said first axis, and means including a part fixed to said base means, effecting operation of said power means in response to and in accordance with the direction and amount of angular movement of said gyroscope about its said precession axis.

9. In a system for stabilizing a gun mounted for elevation about a normally horizontal first axis on and relatively to a combat vehicle, a support carried by said gun for pivotal movement about a second axis parallel to said first axis, means operable to adjust said support relatively to the gun about said second axis and normally connecting said support for movement as a unit with said gun about said first axis, a two-degree-of-freedom rate-responsive gyroscope carried by said support with the mutually-normal spin and precession axes of said gyroscope lying in a plane perpendicular to said second axis, power means on said vehicle for moving said gun in elevation, and means carried by said support and fixed thereto for operation by said gyroscope to effect movement of said power means at a rate proportional to angular movement of said gyroscope about its precession axis and in a direction corresponding to the direction of precession.

JEFF SMITH RHYNE.

REFERENCES CITED

The following references are of record in the file of this patent:

UNITED STATES PATENTS

| Number | Name | Date |
|---|---|---|
| Re. 14,435 | Sperry | Feb. 19, 1918 |
| 1,801,947 | Boykow | Apr. 21, 1931 |
| 1,869,840 | Boykow | Aug. 2, 1932 |
| 1,931,191 | Gray | Oct. 17, 1933 |
| 2,256,833 | McDonald | Sept. 23, 1941 |
| 2,299,117 | Von Manteuffel | Oct. 20, 1942 |
| 2,381,160 | Hanna | Aug. 7, 1945 |

FOREIGN PATENTS

| Number | Country | Date |
|---|---|---|
| 6,570 | Great Britain | 1913 |